June 28, 1927.
E. F. HATHAWAY
ART OF MAKING LAMINATED BELTS
Filed Aug. 22, 1925 2 Sheets-Sheet 2
1,634,145
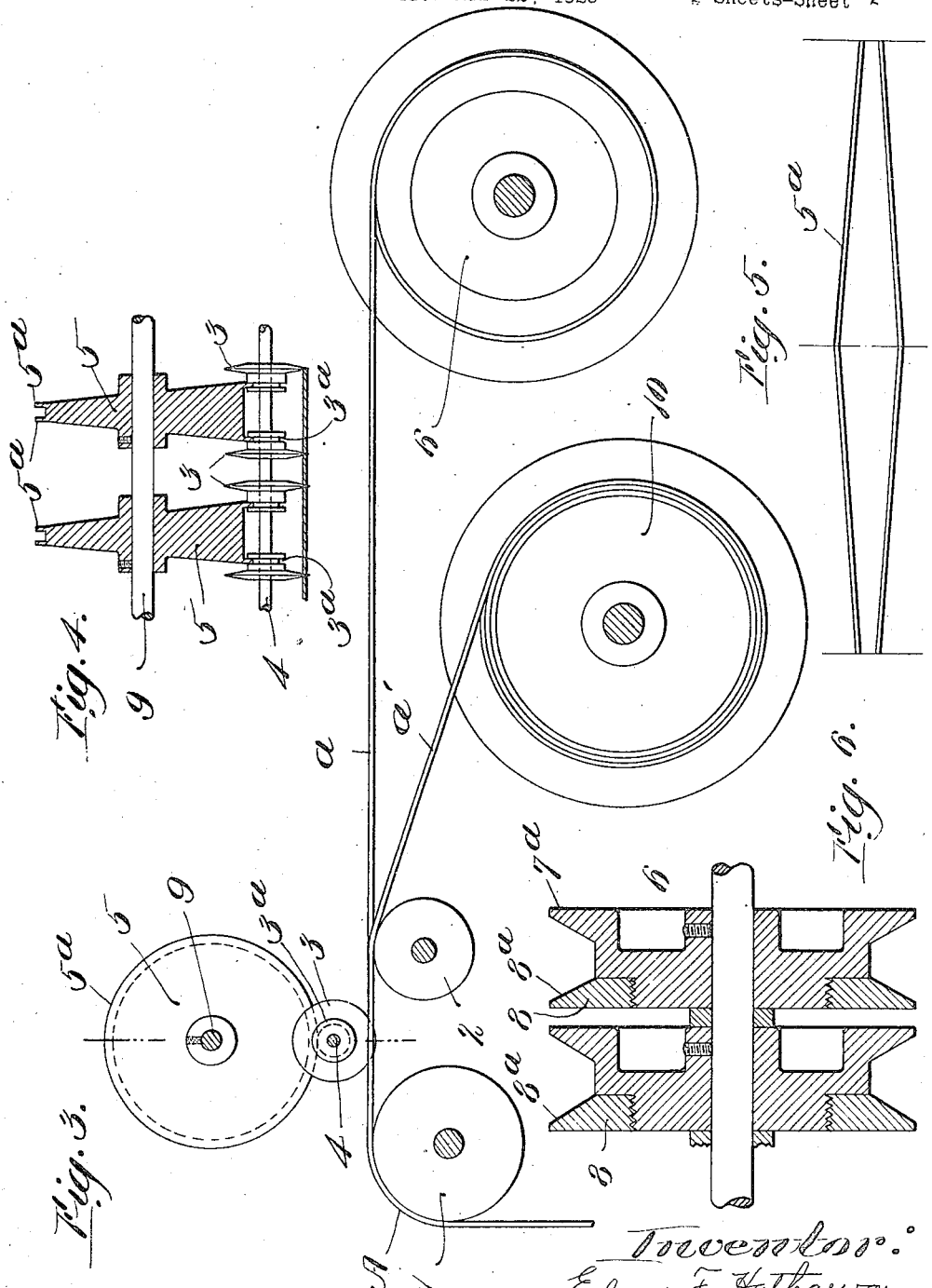

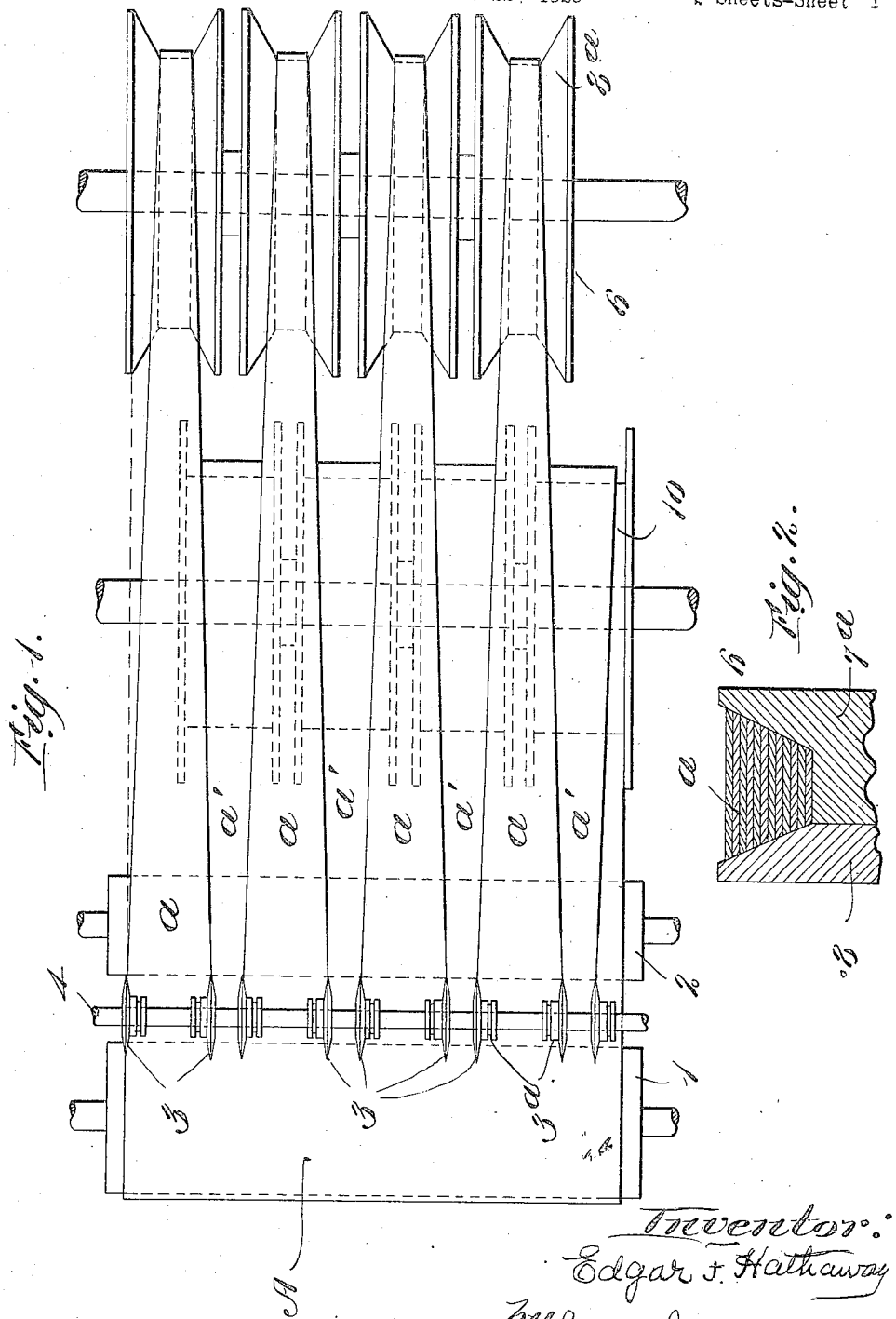

Patented June 28, 1927.

1,634,145

UNITED STATES PATENT OFFICE.

EDGAR F. HATHAWAY, OF WELLESLEY, MASSACHUSETTS.

ART OF MAKING LAMINATED BELTS.

Application filed August 22, 1925. Serial No. 51,744.

This invention relates to the production of laminated belts and more particularly belts having a tapered or trapeziform cross-section for use in grooved pulleys.

Heretofore it has been the practice to fabricate such belts by winding one or more sheets of fabric with appropriate adhesive coating around a drum or drums, thus forming a wide endless band which was then cut into narrow strips of the proper cross-sectional shape but this method resulted in a very large waste of material, since the trimming off of the sides of each belt to give it the desired transverse taper often results in wasting as much as half of the material, particularly when cutting narrow belts.

The present improvement in this art eliminates nearly all the waste of material involved in the old methods and affords a simple and economical method of producing such belts, which consists essentially of severing the sheet or sheets of fabric from which the belts are made into tapered strips of sufficient length when coiled or wound, to form the desired belt, the taper of the strips being calculated according to the length of the belt to be made and to the transverse taper of such belts so as to build up or form individual belts of the desired shape in cross-section.

This and other features of the invention will be explained in the following specification and will be defined in the claims annexed.

In the commercial practice of this invention it will be found economical and expeditious to employ special mechanical devices for carrying out steps in the process, and to aid in a complete practical understanding I have illustrated in the accompanying drawings, somewhat diagrammatically, sufficient apparatus to make clear in what manner the process may be conveniently performed although it will be understood that any other suitable apparatus may be employed and that the process is capable of being performed by hand without the use of power apparatus.

Of said drawings:

Figure 1 is a plan view showing severing and winding devices co-ordinated for the performance of the process.

Figure 2 is an enlarged detail showing, in cross section, the laminated belt as it would appear when coiled over the winding drum or spool.

Figure 3 is a side elevation of the apparatus shown in Figure 1 illustrating the separate winding of the reversely tapered strips.

Figure 4 is an enlarged detail view showing, in central section, the shifting cams for controlling the converging and divergent movements of the cutters.

Figure 5 is a diagrammatic view showing a flat development of one of these cams.

Figure 6 is a central section through a pair of the coiling or winding spools on which the belt is wound.

The belting fabric most commonly employed for the production of laminated belts of this class is a woven fabric of the character of cotton duck or canvas which is coated or impregnated with any suitable adhesive or cement to bind the successive layers of the fabric closely together and cause them to permanently adhere to each other.

The present process is based upon the principle of forming a transversely tapered laminated belt by coiling on itself a longitudinally tapered strip of belting material whose taper is designed or proportioned with special reference to the interior measurement of the belt and the pitch of its cross sectional taper.

A sheet of the belting fabric A is carried over supporting rollers 1 and 2 to present the belt to a series of cutters which, in this case, are shown as sharp edged circular disks 3 loosely mounted on a supporting shaft 4, and having lateral grooved hubs $3^a$, for a purpose presently to be described.

Mounted adjacent to said cutters is a rotary cam shaft 9 to which are secured a series of circular cams 5 which are grooved peripherally to form radially projecting circumferential flanges or ribs $5^a$ which are dimensioned to fit into the grooves in the grooved hubs $3^a$ of the cutters. These cutter-controlling cams 5 are so constructed that on one side the grooves separating the flanges $5^a$ are very narrow, while on the opposite side this circumferential groove is much wider, the difference in width being proportioned to the amount of shift that is required to produce the desired movements of the cutters transversely of the fabric where they are arranged to cut so as to give the desired degree of taper to the narrow belt-forming strip into which the sheet is cut. For example, if the width of the interior surface of the tapered belt is to be one inch and the width of the exterior surface is to be two inches, then the cam would be so designed that the cutters would be spaced apart one inch when severing the narrow end of the belt-forming strip and would be accordingly spread apart to a width of two inches when cutting the outer end of the belt-forming strip.

Within these limits the degree of taper would depend upon the length of the belt to be formed so that with a comparatively short belt the revolution of the cam would be more rapid, thereby causing a steeper taper than in cases where the strips are intended for belts of greater length.

By reference to Figure 2 it will be seen that the laminations or layers of the belt increase in width from the interior to the exterior of the belt so as to give it the trapeziform or tapered shape in cross-section. Consequently, in forming the belt the small or narrow end of the strip will be wound inside and the progressively wider portions will be wound exteriorly thereof and coiled thereon. By reference to Figures 1 and 4 it will be seen that as the sheet of fabric passes under the cutters and as the cutters, in alternation, converge or separate accordingly, in order to form the narrow or the wide portions of the strip, the severing operation results in the production of two oppositely tapered series of strips $a$ and $a'$, one of which is narrow at its forward or delivery end and widens toward its rear end, while the other series, alternating with the first-mentioned series, comprises strips $a'$ which are wide at their forward or delivery ends and are narrowed at their rear ends.

Now as it is necessary, in order to form the transversely tapered belt with its inside face narrower than its outside face, that its narrow end shall be coiled inside of the progressively wider portions, it will be seen that only one of these two series of belt-forming strips are delivered from the cutters at a given time so that they can be wound directly into the form of the complete belt.

By reference to Figure 1 it will be seen that the strips $a$ have very narrow forward ends wound around belt-forming drums or spools 6, with tapered sides to accommodate the increasing width of the strip as it builds up toward the outside of its spool. The alternate strips $a'$, however, are carried around a drum 10 with their wide ends inside and their narrow ends outside. Consequently, these strips must be re-wound upon spools similar to the belt-forming spool 6.

Where the belt is so short that it may be conveniently formed of a single spool, the spool would preferably be made in two separable parts, a body member 7 and a removable flange 8, each of which members are provided with a tapered annular shoulder or rib $7^a$ and $8^a$, respectively, to insure the proper winding or coiling of the different layers to form the symmetrically tapered cross sectional contour of the belt. In cases where the belt is so long that winding about two spaced spools is preferable, the removable head feature is not necessary, but as this forms no part of the present invention this and other details of apparatus construction are omitted from the present description.

It will, therefore, be seen that under the above described process of forming the belt there is no substantial waste of material since, except for the very narrow strip along the selvage of the belting fabric, there is no loss at all and the whole interior portion of the piece of wide fabric is utilized without loss or waste. The severing of the sheet material into alternate widening and narrowing strips, and the winding or coiling of the progressively widening strips into a tapered belt can, therefore, be practiced expeditiously and practically doubles the number of belts obtained from the same amount of material in cases where the thickness of the belt and its width are substantially the same. Even in the case of belts that are materially wider than their thickness, there is a material saving.

Of course, it will be understood that in the winding operation that forms a complete belt, tension and pressure would be applied to bring the successive layers or coils into close compacted contact and the belt, when removed, would be cured in the usual manner to make the adhesion permanent; but in the case of winding on the intermediate spool or drum those strips whose forward ends are widest, the coiling or winding on the intermediate drum would be performed without the attendant pressure and tension and the re-winding would take place without waiting for the cement to set. As such operations form no novel part of the present invention no detailed description thereof is necessary.

What I claim is:

1. The improvement in the art of making laminated belts which consists in severing a sheet of the belting fabric into relatively narrow strips longitudinally tapered from end to end, and winding such a tapered strip into a laminated coil with the narrow end inside, thereby producing a laminated belt of tapered cross section.

2. The above described process of making laminated belts, which consists in severing a sheet of the belting material into two series of relatively narrow strips oppositely tapered from end to end and winding said strips into coils of proper length with the narrow portions innermost to form belts of the desired length and transverse taper.

3. The above described process of making laminated belts which consists of severing a sheet of belting material into two sets of belt-forming strips that are oppositely tapered from end to end, winding one set of strips directly into the form of a complete belt transversely tapered from a narrow inside to a wide outside, winding the other set of strips with their wide ends inside and their narrow ends outside, and rewinding the latter strips in the reverse order, substantially as described.

In witness whereof, I have subscribed the above specification.

EDGAR F. HATHAWAY.